June 6, 1944.    F. BUCKINGHAM    2,350,722
FATIGUE TESTING MACHINE
Filed April 6, 1942    4 Sheets-Sheet 1
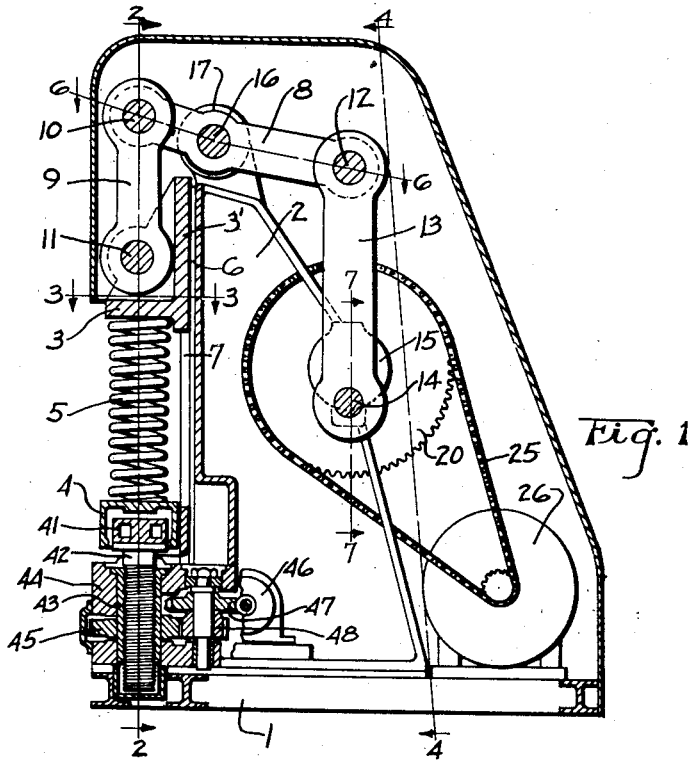
Fig. 1
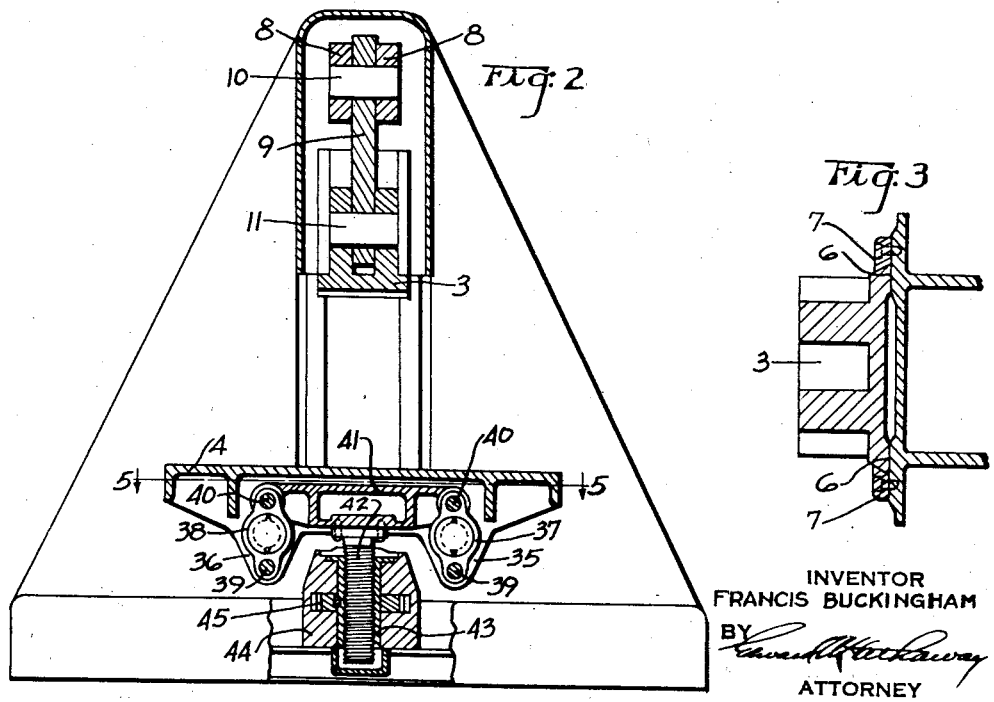
Fig. 2
Fig. 3
INVENTOR
FRANCIS BUCKINGHAM
BY
ATTORNEY June 6, 1944.                F. BUCKINGHAM                 2,350,722
                          FATIGUE TESTING MACHINE
                          Filed April 6, 1942              4 Sheets-Sheet 2
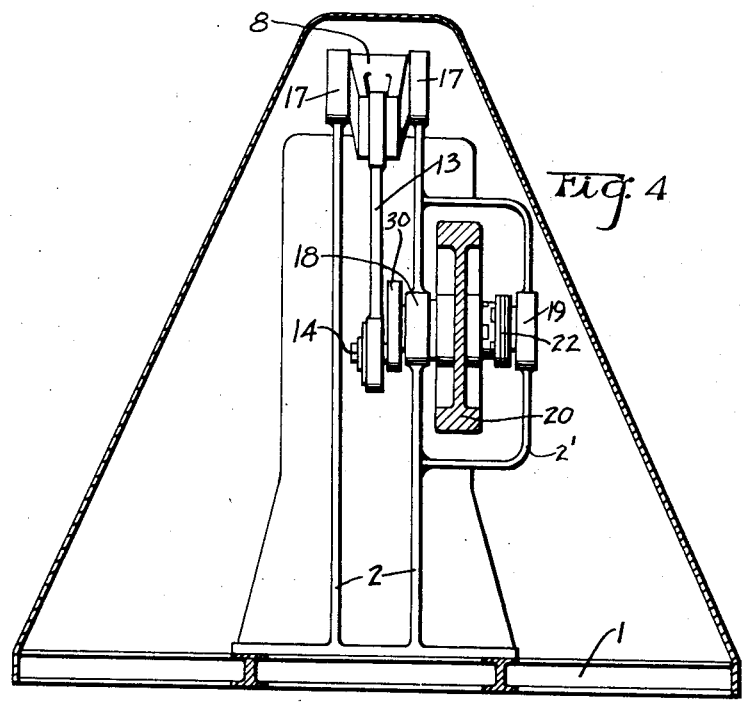
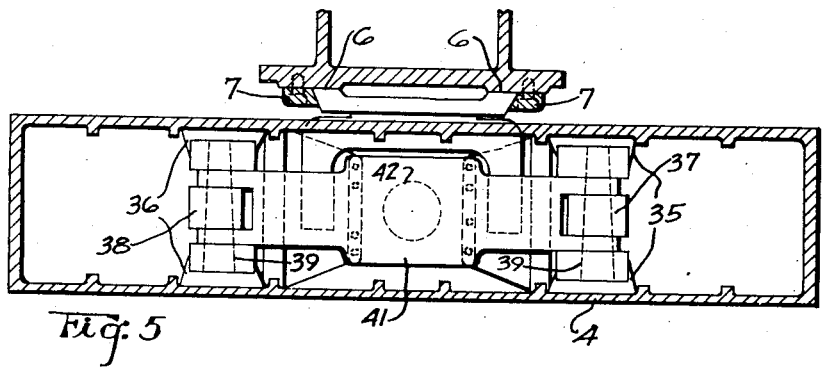
INVENTOR
FRANCIS BUCKINGHAM
BY
ATTORNEY June 6, 1944.　　　F. BUCKINGHAM　　　2,350,722
FATIGUE TESTING MACHINE
Filed April 6, 1942　　　4 Sheets-Sheet 3

INVENTOR
FRANCIS BUCKINGHAM
BY
ATTORNEY

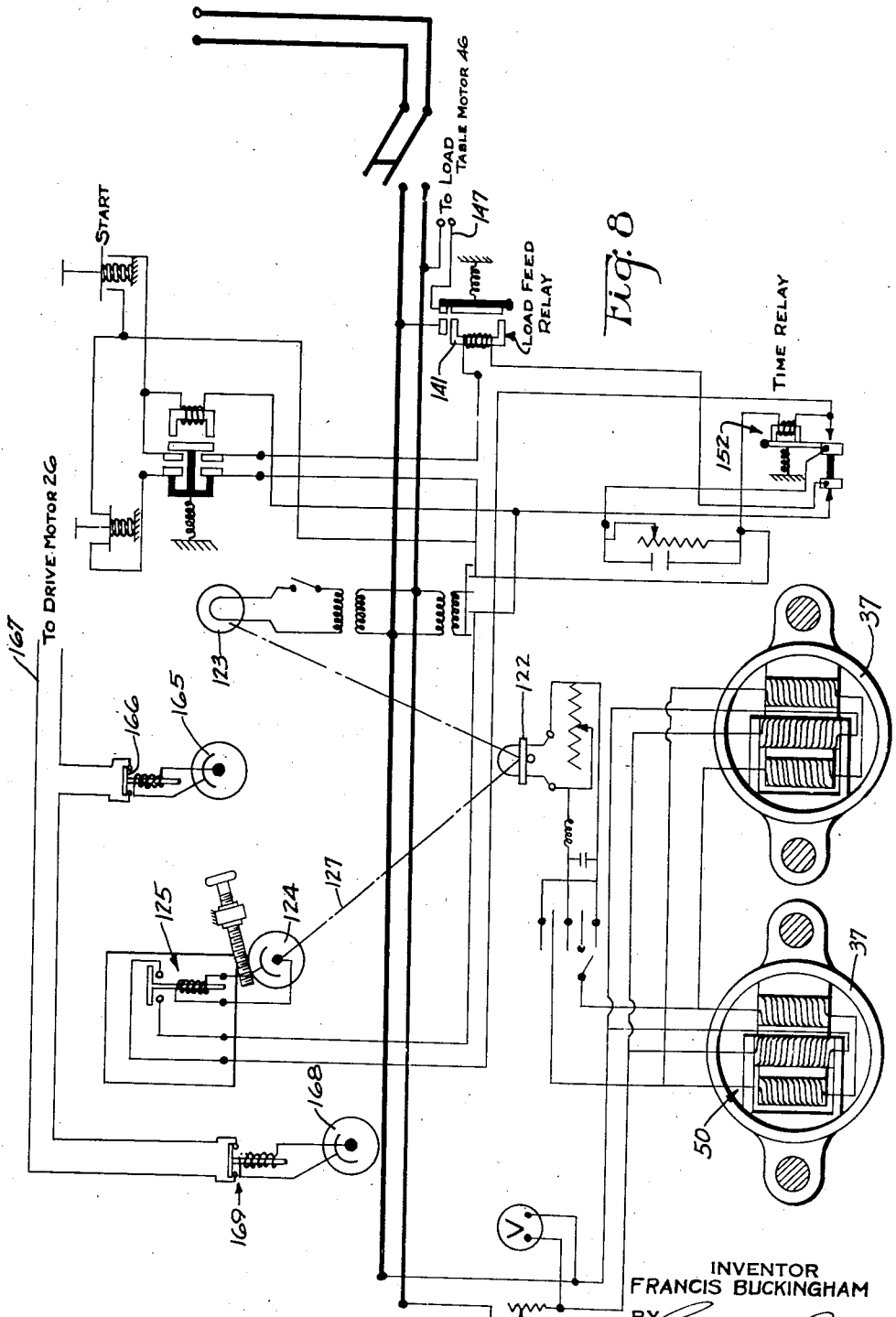

Patented June 6, 1944

2,350,722

UNITED STATES PATENT OFFICE 2,350,722

FATIGUE TESTING MACHINE

Francis Buckingham, Franklinville, N. J., assignor to The Baldwin Locomotive Works, a corporation of Pennsylvania Application April 6, 1942, Serial No. 437,821

4 Claims. (Cl. 73—51)

This invention relates generally to materials testing machines and more particularly to fatigue testing.

Various types of fatigue testing machines have been proposed and used but the difficulty with certain of these machines is that when the specimen starts to weaken, as by passing its yield point or otherwise tending toward failure, the load falls off and is restored to normal only by increasing the stroke or the extent of repetitive loading. The foregoing covers only a limited field of actual conditions whereas in other fields the magnitude of the operating stroke does not change and the load remains constant even though the machine under load weakens.

It is an object of my invention to provide an improved fatigue testing machine adapted to compensate for any weakening of the specimen so as to maintain uninterrupted application of repeated loading not only within the desired limits of load fluctuations but also under constant loading conditions.

Another object is to provide an improved fatigue testing machine of the type herein disclosed in which the load control functions are effected automatically in response to certain predetermined conditions of operation whereby as the specimen weakens the machine is automatically adjusted to maintain a desired repetitive load of the specimen but without increasing the loading stroke on the specimen.

A further object is to provide an improved fatigue testing machine of the foregoing type of a relatively simple, economical and yet sturdy construction combined with a high degree of accuracy, sensitivity and flexibility of operation and control.

Other objects and advantages will be more apparent to those skilled in the art from the following description of the accompanying drawings in which:

Fig. 1 is a partial vertical section through my improved machine;

Fig. 2 is a transverse section taken substantially on the line 2—2 of Fig. 1;

Fig. 3 is a horizontal section taken substantially on the line 3—3 of Fig. 1;

Fig. 4 is a transverse section taken substantially on the line 4—4 of Fig. 1;

Fig. 5 is a section taken substantially on the line 5—5 of Fig. 2;

Fig. 8 is a mechanical and electrical diagram for automatically controlling the actuation and loading operation of the machine.

In the particular embodiment of the invention disclosed herein for purposes of illustration, I have provided as shown in Fig. 1 a suitable base 1 and a vertical column-like frame or bracket 2. A reciprocating loading head 3 and a lower load adjusting table are provided to receive a specimen, such as a coil spring 5 or any other suitable type or form of specimen for repetitive loading as in a fatigue test.

Figure 6:
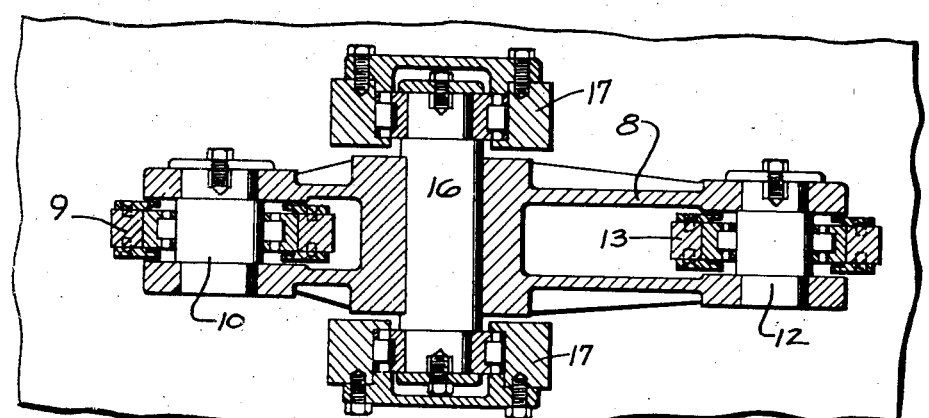
Fig. 6 is a horizontal section taken substantially on the line 6—6 of Fig. 1.
Figure 7:
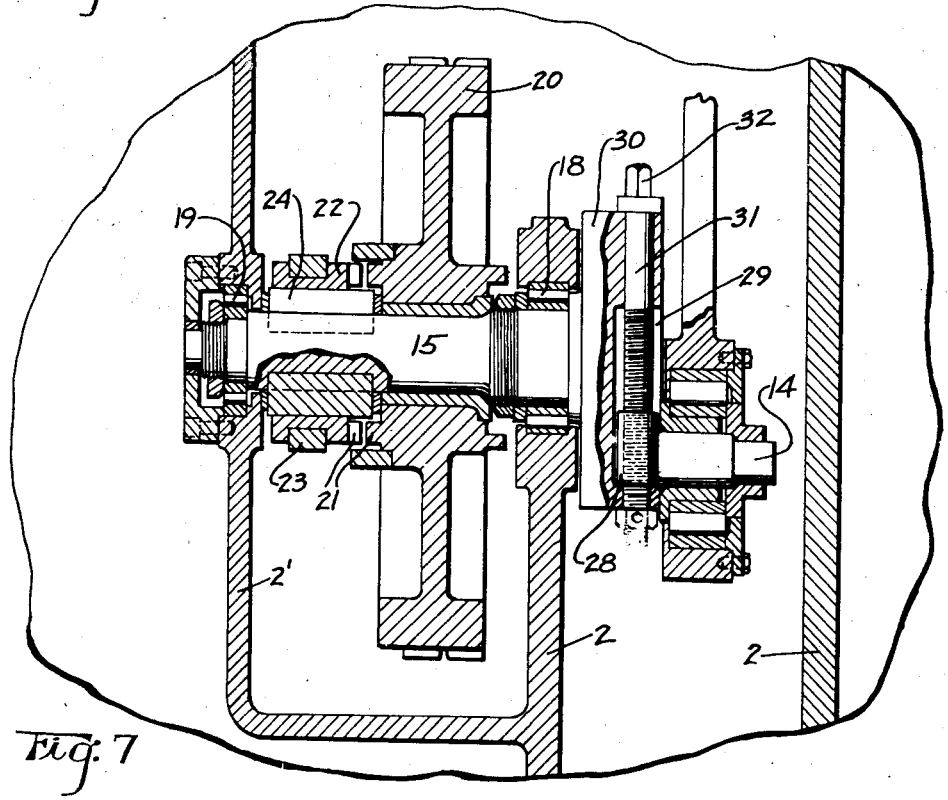
Fig. 7 is an enlarged fragmentary sectional view taken substantially on the line 7—7 of Fig. 1.

*Loading mechanism.*—Head 3 has a vertical portion 3' which as shown in Figs. 1 and 5 is slidably supported on guide surfaces 6 and held by tapered gibs 7. A walking beam 8, Fig. 1, is connected to head 3 by a link 9 through pins 10 and 11 and is also connected through a pin 12 and connecting rod 13 to a crank pin 14 of a crankshaft 15. The walking beam 8 is suitably journalled on a pin 16 supported in a pair of ears 17 projecting upwardly from the vertical column 2 while the crankshaft, as shown in Figs. 4 and 7, is rotatably supported by bearings 18 and 19 in frame 2 and in a bracket 2' projecting laterally therefrom. To drive the crankshaft 15 a sprocket 20 is freely journalled on shaft 15, Fig. 7, and may be selectively connected to or disconnected from the shaft by a dog clutch having interfitting teeth 21. One set of teeth are formed on the sprocket while the other set is mounted on a collar 22 axially shiftable through any usual manually operated lever and shipper ring 23, the collar 22 being keyed to the shaft as at 24. A chain 25, Fig. 1, and motor 26 drive the sprocket 20 so that when clutch teeth 21 are in engagement motor 26 causes head 3 to reciprocate. To vary the stroke of head 3 crank pin 14 is radially adjustable by being provided with an enlarged threaded head 28 slidably guided in a recess 29 of a circular hub 30. A screw 31 is threaded in nut 28 and is manually rotatably adjustable by being journalled in hub 30, a head 32 being provided on screw 31 to receive a suitable wrench. By angular adjustment of screw 31 the nut 28 and crankpin 15 may be radially adjusted to determine the stroke of loading head 3.

*Load adjusting mechanism.*—It is desired in the present invention to simulate true loading conditions even during weakening of the specimen and I accomplish this by maintaining a constant loading stroke but varying the distance between the table 4 and loading head 3 thereby to compensate for any weakening of the specimen. Specifically the foregoing distance is controlled by moving table 4 automatically upwardly in response to a tendency of the loading force to decrease thereby re-establishing or maintaining the full loading force on the specimen without any change in loading stroke. To effect this operation load adjusting table 4 is provided, Fig. 2, with two sets of depending brackets 35 and 36, each set consisting of a pair of arms spaced apart to receive elastic rings 37 and 38. These elastic rings are identical in construction and are provided with ears connected by lower pivot pins 39 to arms 35 and by upper pivot pins 40 to a crosshead 41. The load adjusting table 3 is therefore dependently supported on crosshead 41 through the elastic rings 37 and 38. These elastic rings are of suitable cross-sectional thickness so as to carry the entire load without stressing the rings beyond their elastic limit and therefore the extent of deformation of the rings is an indication of and is in proportion to the load imposed upon the specimen. To vertically adjust table 3 the crosshead 41 is bolted on top of a non-rotatable screw 42 threaded in a relatively long nut 43 which is journalled within a suitable boss 44 formed on base 1. To rotate nut 43 a gear 45, Figs. 1 and 2, is keyed thereto and this gear is driven by a motor 46 through a worm gear 47 and pinion 48.

*Load responsive and control circuit.*—In the following description it will be assumed that the machine is operating with motor 26, Fig. 1, driving crankpin 14 and causing loading head 3 to continuously reciprocate through a predetermined stroke as determined in accordance with the manual adjustment of screw 31, Fig. 7. To maintain a constant load on the specimen, I control motor 46 in response to the load on specimen 5 so as to raise the elevation of platform 4, this being accomplished by employing preferably a circuit somewhat similar to that shown in my Patent 2,243,413, issued May 27, 1941. This circuit is connected into my improved machine by inserting preferably in both of the elastic rings 37 and 38, Fig. 2, a magnetic strain gauge diagrammatically indicated at 50, Fig. 8. The circuit and its operation, with certain exceptions to be noted, is identical to that disclosed in said patent and therefore it need not be further described herein, except to point out that magnetic strain gauge 50 operates a pivotal mirror 122 in response to deformation of the elastic rings 37 and 38, this deformation being proportional to the load on the specimen. The strain gauges 50 of each ring 37 and 38 are connected in series so that the sum equals the total load on the specimen. Hence, if eccentric loading occurs one ring will carry a larger load than the other but this is automatically added to indicate the total load. A beam of light 127 from a source 123 is reflected so as to energize a photocell 124 whereby when the desired load is on the specimen the light beam 127 energizes photocell 124 thereby to open a relay 125 deenergize a relay 141 thereby breaking the supply circuit leads 147 to load adjusting motor 46. Relay 141 is closed so long as the load on the specimen is not maintained at the desired constant value thereby causing table motor 46 to continually increase the load on the specimen until the desired load is obtained. When the desired load is obtained the light beam 127 will energize photocell 124 and break the circuit for motor 46 as above described. Weakening of the specimen will cause the elastic rings 37 and 38 to be contracted toward their original shape and accordingly cause magnetic strain gauge 50 to swing the mirror 122 and accordingly deflect the light beam away from the photocell 124 whereupon relay 125 will close to re-establish the circuit for load table motor 46. If for any reason the load should become excessive then it is desirable to shut down the entire machine and this is accomplished by providing a second photocell 165 which will be energized by the light beam 127 to open a normally closed relay switch 166 thereby breaking the circuit 167 to drive the motor 26. Usual relay controls may be employed in the drive motor circuit so that when the machine shuts down the light beam 127 possibly moves off the photocell 165 the motor circuit will not be reestablished. Inasmuch as such controls are well-known it is not deemed necessary to describe the same. Similarly, if the load on the machine should become excessively low or be completely removed such as when the specimen ruptures, then light beam 127 will be swung completely over to energize a third photocell 168 which will open its relay 169 thereby stopping the drive motor 26 as previously mentioned. It will be understood that with the exceptions noted the circuit and mode of operation thereof herein used is identical to the circuit and its operation as disclosed in my said patent and hence a further detailed description is not necessary. It might be mentioned that momentary movements of light beam 127 on to and off of photocell 124 will not necessarily discontinue operation of the load adjusting motor 46 because a time relay 152 is inserted in the circuit to bridge over the temporary movements of the light beam in response to repeated loadings.

It will of course be understood that various changes in details of construction and arrangements of parts may be made by those skilled in the art without departing from the spirit of the invention as set forth in the appended claims.

I claim:

1. A fatigue testing machine comprising, in combination, a load adjusting table adapted to support a specimen, an opposed reciprocating head engageable with the specimen for imposing a repetitive load thereon, means for reciprocating said head with a constant length of stroke, means for moving said table toward said head to control the load on the specimen independently of the stroke of said reciprocating head, power means for actuating said table moving means, and means responsive to the load transmitted to said table for controlling said power means.

2. A fatigue testing machine comprising, in combination, a load adjusting table adapted to support a specimen, an opposed reciprocating head engageable with a specimen for imposing a repetitive load on the specimen, means for reciprocating said head with a constant length of stroke, means for moving said table toward said head to control the load on the specimen independently of the stroke of said reciprocating head including a crosshead supported upon a screw and a nut connected to said screw whereby relative rotation between the nut and screw varies the position of said support relative to said reciprocating head, a plurality of elastic load weighing rings connected to said support and to said table, said rings being so arranged at different points between the table and support as to maintain the table at all times in a predetermined position relative to the support, whereby load on the specimen is transmitted through said table and weighed by said rings to determine the extent of adjustment necessary to maintain a predetermined load on the specimen, power means for relatively rotating said screw and nut, and means responsive to the load transmitted from said table to the load weighing rings for controlling said power means so as to effect said control of the load on the specimen.

3. A fatigue testing machine of the type having a reciprocating head connectible to a specimen for imposing a continuously repetitive load on the specimen while maintaining a constant length of stroke of said head comprising, in combination, a load adjusting table adapted to support a specimen in opposition to said head, a crosshead disposed beneath said table, load weighing means including a plurality of load weighing elements connected to said table and dependently connected to said crosshead at points offset on opposite sides of the table center whereby the table is vertically supported through the depending hanging action of the weighing elements which tend to elongate under compression loads transmitted to said table from a specimen supported thereon, and means for moving said table toward said reciprocating head to control the load on the specimen independently of the stroke of said reciprocating head.

4. The combination set forth in claim 3 further characterized in that each of said plurality of dependently supported load weighing elements are pivotally connected to both the crosshead and table with the pivotal axes of said weighing elements substantially parallel to each other.

FRANCIS BUCKINGHAM.